(No Model.) 2 Sheets—Sheet 2.
C. SNYDER.
PLANTING MACHINE.
No. 305,349. Patented Sept. 16, 1884.
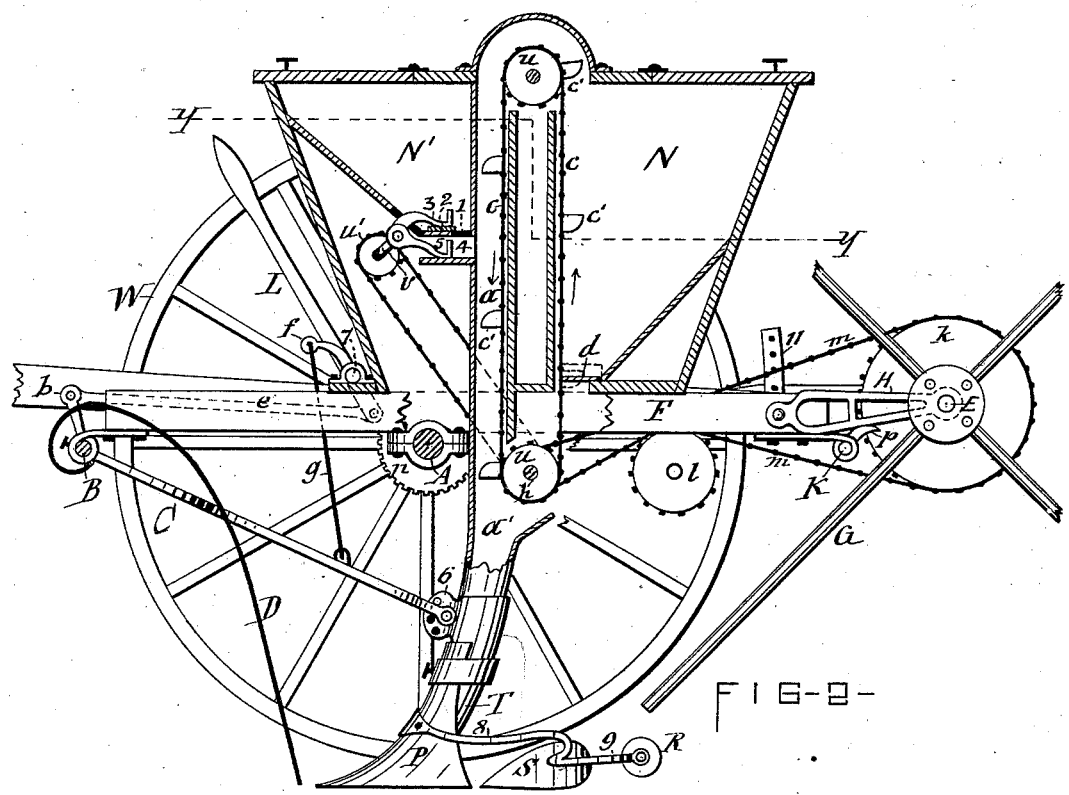
FIG-2-
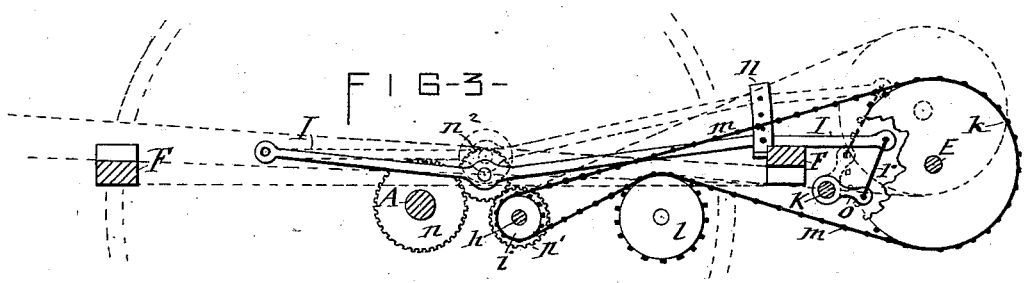
FIG-3-
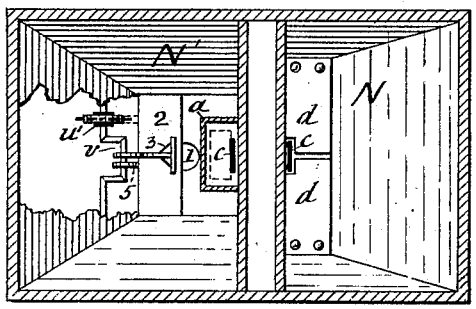
FIG-4-
FIG-5-
ATTEST—
Geo. C. Raymond
C. Bendixon
INVENTOR—
Charles Snyder
pr Dully Laass Hry
Attys

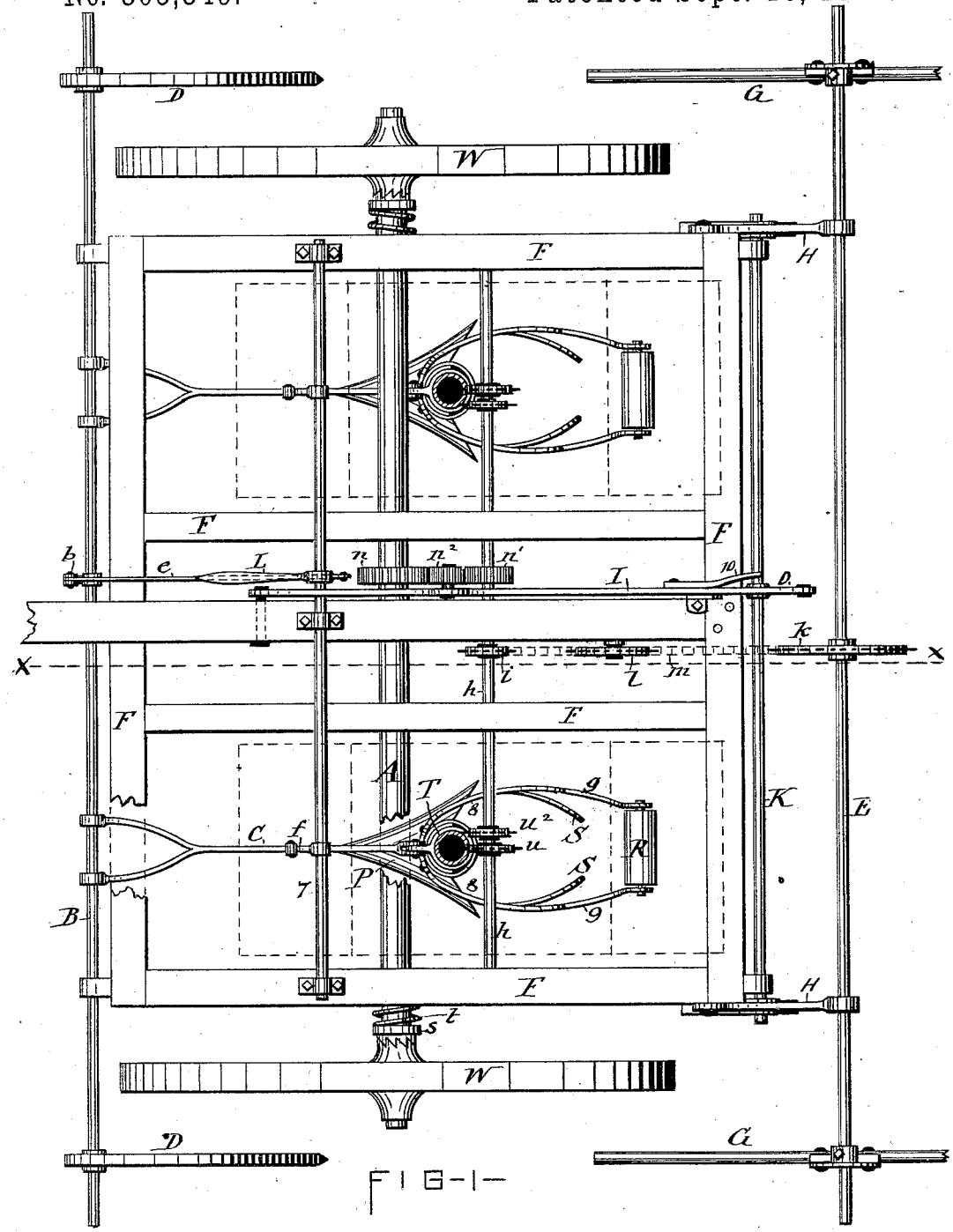

UNITED STATES PATENT OFFICE.

CHARLES SNYDER, OF FAIRMOUNT, NEW YORK.

PLANTING-MACHINE.

SPECIFICATION forming part of Letters Patent No. 305,349, dated September 16, 1884.

Application filed June 9, 1884. (No model.)

*To all whom it may concern:*

Be it known that I, CHARLES SNYDER, of Fairmount, in the county of Onondaga, in the State of New York, have invented new and useful Improvements in Planting-Machines, of which the following, taken in connection with the accompanying drawings, is a full, clear, and exact description.

This invention consists in a novel organization of a machine adapted for planting potatoes and other seeds, either in hills or rows, all as hereinafter fully described, and specifically set forth in the claims.

The invention is fully illustrated in the annexed drawings, wherein Figure 1 is a plan view of the planting-machine, with the hoppers removed to better illustrate the mechanism underneath the hoppers. Fig. 2 is a longitudinal vertical section of the machine, taken through the center of one of the hoppers. Fig. 3 is a longitudinal section on line $x\,x$, Fig. 1. Fig. 4 is a horizontal section on line $y\,y$ of the hopper, and Fig. 5 is a vertical transverse section.

Similar letters of reference indicate similar parts.

F represents the frame of the machine, supported on an axle, A, which receives rotary motion from carrying-wheels W, mounted loose on said axle, and having on their hub a ratchet-face engaging with a ratchet-collar, $s$, which slides on the axle, and is held yieldingly engaged with the ratchet of the hub by a spring, $t$, interposed between the collar and frame, as illustrated in Fig. 1 of the drawings. The collar $s$ has its axial bearing grooved to engage with a spline on the axle, and thus transmits motion from the wheel-hub to the axle. The pitch of the ratchets is so disposed that said ratchets automatically release each other in backing the machine.

N and N' designate, respectively, a seed-hopper and a fertilizer-hopper placed adjacent to each other on top of the frame F. Vertically through the two hoppers is extended an endless conveyor or an endless chain, $c$, to which are connected a series of cups, $c'$, said cups varying in size according to the nature of the seed to be planted, and also varying in number. For planting in hills they are to be arranged a proper distance apart to drop the seed at the requisite intervals, and for planting in rows they are to be close to each other with merely sufficient distance between them to allow the seeds to enter said cups. Said endless chain is extended around two sprocket-wheels, $u\,u$, one of which is journaled between the two hoppers N N' at the top thereof, and the other sprocket-wheel is mounted on the shaft $h$, extended across the under side of the frame F, and also arranged central between the two hoppers, so that the ascending portion of the chain passes through the seed-hopper N, and the descending portion of the chain through the fertilizer-hopper N'. The chain receives its aforesaid movement from the shaft $h$, which is rotated by gears transmitting motion from the axle to said shaft, as hereinafter described. The bottom of the hopper N has an automatic closing gate, $d$, in the form of leather disks fastened at one end, and having their adjacent ends free to allow the cups $c'$ to force themselves into the hopper, as illustrated in Fig. 5 of the drawings. The free ends of the disks, so soon as liberated from the cup, automatically drop back into their normal position to prevent the escape of the seed from the hopper.

The fertilizer-hopper N' is provided with a chute, $a$, which incloses the conveyor $c\,c'$. The bottom portion of said hopper is horizontal, and provided with a discharge-port, 1, and with a slide or feed-gage, 2, by which to regulate the egress of fertilizer through the port 1. Under the hopper is a passage, 4, which communicates with the chute $a$. A crank-shaft, $u$, underneath the hopper N' receives rotary motion by means of a sprocket-wheel, $u'$, fixed to said shaft, and a drive-chain connecting the said sprocket-wheel with another sprocket-wheel, $u^2$, on the shaft $h$. To the crank of the shaft are attached two arms, 3 and 5, one being extended into the hopper, and by its reciprocating motion serving to agitate or stir up the fertilizer, so as to facilitate its escape through the port 1. The other arm, 5, reaches into the passage 4, and in its reciprocating movement pushes the fertilizer into the chute $a$.

In the operation of the machine, the seed drops from one cup, $c'$, onto the back of the cup in front of it as they pass over the upper sprocket-wheel, $u$, and in passing by the passage 4 under the hopper N' the pusher 5 throws the requisite quantity of fertilizer onto the seed, the two substances conjointly descend in the chute and finally drop through the spout $a'$ into the planting-tube T. This tube is fitted loosely on the spout $a'$, and is adjustably sustained in its position by means of a rod, C, hung at one end on a shaft, B, extended across the front end of the frame F. The opposite end of the aforesaid rod is connected to an ear, 6, on the tube T, which ear is provided with a series of holes for the reception of a wooden pin, which, by its bearing on the top of the rod C, presents sufficient resistance to the rearward strain of the tube without endangering the integrity of the said rod and parts connected therewith. The shaft B is mounted loosely in suitable bearings on the frame F, and has affixed to it an arm, $b$, which is connected by a rod, $e$, with the foot of a lever, L, fastened to a shaft, 7, extended across the frame, as best seen in Fig. 1 of the drawings. The shaft 7 has rigidly attached to it an arm, $f$, which is connected with the rod C by a rod or chain, $g$. By swinging the lever L rearward the arm $f$ is caused to raise the tube T. The latter can thus be brought in a safe position during the transportation of the machine to and from the field.

P denotes a plowshare clamped on the tube T to open the furrow in which to deposit the seed. To said plowshare are attached rearwardly-extended arms, 8, carrying back of the tube T two hilling shares or scrapers, S, which serve to cover the seed in the furrow, and from said hillers are extended rearward two arms, 9, on the ends of which is pivoted a roller, R, which presses and to some extent crushes the soil over the seed.

D designates a marker consisting of a spring-arm secured to the shaft B, so as to turn therewith, and thus be thrown in and out of its operative position simultaneously with the lowering and raising of the planting-tube T. The marker is fastened on the shaft B by a set-screw, and by loosening the same the marker can be shifted on the shaft to carry it a greater or less distance out from the side of the frame. The free end of said marker drags through the ground, and thus leaves a mark, which serves as a guide in which to run the carrying-wheel of the machine on the return trip, the marker being so adjusted in its position that in following the mark, as aforesaid, the machine is caused to plant the successive rows equidistantly apart.

G designates an indicator, designed to leave a mark where the seed is deposited in the ground. Said indicator consists of spokes or radial arms secured to a hub mounted adjustably on a shaft, E, which is extended across the rear end of the frame F, and journaled in the free end of rearwardly-extended arms H, pivoted on the frame F, said arms being supported by cams $p$, fixed to another shaft, K, journaled in suitable bearings or brackets attached to the rear end of the frame F. By turning the latter shaft the cams $p$ can be made to lift the arms H, and thus raise the indicator clear of the ground when turning the machine about or when taking it to and from the field. This raising of the indicators is effected simultaneously and automatically with the act of stopping the planting mechanism of the hopper by means of a lever, I, pivoted at one end on the frame or tongue, and having pivoted on it a pinion, $n^2$, in such relative position as to come intermediately between the driving-gear $n$ on the axle A and a gear, $n'$, on the shaft $h$, to which are also attached the sprocket-wheels $u$ and $u^2$, which transmit motion to the planting mechanism of the hopper, as hereinbefore described. The free end of the lever I, which is extended to the rear end of the frame F, is connected by a rod, $r$, with an arm, $o$, on the shaft K. Said arm stands at such an angle from the shaft K that in raising the lever I the shaft is turned in such a direction as to cause the cams $p$ thereof to lift the arms H, which carry the shaft E, on which the indicators G are mounted; and in raising the lever I, as aforesaid, the pinion $n^2$ is thrown out of connection with the gears $n$ and $n'$, and the movement of the planting mechanism is thus stopped.

By a dog, 10, engaging with a perforated segment, 11, fixed to the frame, the lever I is retained in its elevated position.

The indicators G are caused to operate in unison with the planting mechanism by properly-proportioned sprocket-wheels $i$ and $k$, respectively, on the shafts $h$ and E, connected by a drive-chain, $m$; and in order to maintain said chain on the wheels $i$ and $k$, I place between the latter an idler, $l$, over which the chain runs.

Having described my invention, what I claim as new, and desire to secure by Letters Patent, is—

1. In combination with a planting-tube, two hoppers, and a conveyer communicating with both hoppers and with the planting-tube, whereby the substances of the two hoppers are delivered conjointly to the said tube, substantially as set forth.

2. In combination with a planting-tube, two hoppers, a conveyer extended through both of said hoppers and communicating with the planting-tube, and a feed-gage in one of the hoppers, substantially as set forth.

3. In combination with a planting-tube, a fertilizer-hopper and a seed-hopper, a conveyer communicating with both hoppers and with the planting-tube, a feed-gage in the fertilizer-hopper, and an agitator over the feed-gage, substantially as described and shown.

4. In a planting-machine, the combination of two separate and distinct hoppers, an endless chain arranged to move up through one and down through the other of said hoppers, cups attached to the chain, a chute inclosing the descending portion of the chain, and a discharge-port from the hopper to the chute, and a planting-tube connected to the chute, substantially as set forth and shown.

5. In combination with the hopper N and endless conveyer $c\ c'$, the hopper N', provided with a chute, $a$, port 1, slide 2, agitator 3, passage 4, and pusher 5, substantially as described and shown.

6. In combination with the tube T, the shaft B, rod C, arm $b$, lever L, rod $e$, arm $f$, connection $g$, and the marker D, attached to the shaft B, all combined as described and shown, whereby the marker is thrown in and out of its operative position simultaneously with the planting-tube, substantially as specified.

7. In combination with the frame F and shaft $h$, the pivoted arms H, the shaft E, journaled in the free end of said arms, the indicator G on shaft E, sprocket-wheels $i$ and $k$, respectively on shafts $h$ and E, the chain $m$, and the idler $l$, between the sprocket-wheels, to maintain thereon the chain while raising the shaft E, substantially as set forth.

8. In combination with the shaft E, supported or pivoted arms H, and carrying indicators G, and the axle A and shaft $h$, provided, respectively, with gears $n\ n'$, the lever I, intermediate pinion, $n^2$, pivoted on said lever, shaft K, provided with the arm $o$, and with the cam $p$ under the arm H, and the rod $r$, connecting the arm $o$ with the lever I, substantially as described and shown.

In testimony whereof I have hereunto signed my name and affixed my seal, in the presence of two attesting witnesses, at Syracuse, in the county of Onondaga, in the State of New York, this 6th day of June, 1884.

CHARLES SNYDER. [L. S.]

Witnesses:
 FREDERICK H. GIBBS,
 E. BENDIXON.